US010292131B2

(12) United States Patent
Schliwa-Bertling et al.

(10) Patent No.: US 10,292,131 B2
(45) Date of Patent: May 14, 2019

(54) METHODS AND ARRANGEMENTS IN A WIRELESS COMMUNICATION NETWORK FOR MANAGING CAPABILITY INFORMATION FOR PAGING (71) Applicant: Telefonaktiebolaget LM Ericsson (publ), Stockholm (SE)

(72) Inventors: Paul Schliwa-Bertling, Ljungsbro (SE); Erik Eriksson, Linköping (SE); Emre Yavuz, Stockholm (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 18 days.

(21) Appl. No.: 15/206,565

(22) PCT Filed: Jan. 29, 2015

(86) PCT No.: PCT/SE2015/050094
§ 371 (c)(1),
(2) Date: Jul. 11, 2016

(87) PCT Pub. No.: WO2015/115981
PCT Pub. Date: Aug. 6, 2015

(65) Prior Publication Data
US 2017/0181123 A1 Jun. 22, 2017

Related U.S. Application Data (60) Provisional application No. 61/934,338, filed on Jan. 31, 2014.

(51) Int. Cl.
H04W 68/02 (2009.01)
H04W 72/04 (2009.01)
H04W 4/70 (2018.01)

(52) U.S. Cl.
CPC ............ *H04W 68/02* (2013.01); *H04W 4/70* (2018.02); *H04W 72/048* (2013.01)

(58) Field of Classification Search
CPC ... H04W 72/042; H04W 28/22; H04W 4/005; H04W 68/02; H04W 72/0453;
(Continued)

(56) References Cited

U.S. PATENT DOCUMENTS 8,160,044 B2 * 4/2012 Tseng .................... H04W 28/06
370/329
9,900,896 B2 * 2/2018 Kim ....................... H04J 11/004
(Continued)

FOREIGN PATENT DOCUMENTS

WO 2015065041 A1 5/2015
WO 2015066645 A1 5/2015
WO WO-2015065041 A1 * 5/2015 ............ H04W 68/02

OTHER PUBLICATIONS

International Search Report and Written Opinion dated Jun. 25, 2015 for International Application No. PCT/SE2015/050094, International Filing Date: Jan. 29, 2015 consisting of 10-pages.
(Continued)

Primary Examiner — Matthew C Sams
(74) Attorney, Agent, or Firm — Christopher & Weisberg, P.A.

(57) ABSTRACT

A core network node, e.g. MME, and a first radio network node, e.g., eNB, are comprised in a wireless communication network. The core network node receives information about capability of a communication device with regard to a maximum supported transport block size, "TBS". The core network node transmits, to the first radio network node, information about a limitation of the capability of the communication device with regard to maximum supported
(Continued)

TBS. The information about the limitation is based on the received information about capability.

8 Claims, 6 Drawing Sheets

(58) Field of Classification Search
CPC .............. H04W 72/048; H04W 74/002; H04L 1/0007; H04L 47/10
See application file for complete search history.

(56) References Cited

U.S. PATENT DOCUMENTS

| | | | | |
|---|---|---|---|---|
| 2008/0200201 A1* | 8/2008 | Jonsson | .............. | H04W 52/286 455/522 |
| 2009/0196195 A1* | 8/2009 | Gerstenberger | ........ | H04L 47/14 370/252 |
| 2010/0074130 A1* | 3/2010 | Bertrand | .............. | H04L 1/0007 370/252 |
| 2010/0130217 A1* | 5/2010 | Wu | ........................ | H04W 48/08 455/450 |
| 2010/0309788 A1* | 12/2010 | Ho | .......................... | H04L 47/10 370/236 |
| 2013/0083753 A1* | 4/2013 | Lee | ................... | H04W 72/0453 370/329 |
| 2013/0170347 A1* | 7/2013 | Zhang | ..................... | H04W 4/70 370/230 |
| 2013/0294363 A1* | 11/2013 | Feng | .................... | H04W 74/008 370/329 |
| 2015/0009897 A1* | 1/2015 | Wilhelmsson | ........ | H04L 1/0007 370/328 |
| 2015/0195094 A1* | 7/2015 | Yu | ............................ | H04W 4/70 370/312 |
| 2015/0230249 A1* | 8/2015 | Nguyen | ................... | H04W 4/70 370/329 |
| 2015/0327142 A1* | 11/2015 | Martinez Tarradell | ...................... | H04W 24/10 455/436 |
| 2016/0029395 A1* | 1/2016 | Kim | ........................ | H04J 11/004 370/329 |
| 2016/0270028 A1* | 9/2016 | Lee | ........................ | H04W 68/02 |
| 2016/0338116 A1* | 11/2016 | Bergstrom | .............. | H04W 8/24 |
| 2017/0181123 A1* | 6/2017 | Schliwa-Bertling | ......................... | H04W 68/02 |

OTHER PUBLICATIONS

3GPP TSG-RAN WG2 #85bis, Tdoc R2-141304, Agenda Item: 7.7, Source: Ericsson, Title: "Paging Mechanism for Low Cost UEs", Document for Discussion, Deletion, Valencia, Spain, Mar. 31, 2014 consisting of 2-pages.

* cited by examiner

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1..<maxnoofTAIs> | | | EACH | |
| >>TAI | M | | 9.2.3.16 | | - | |
| CSG Id List | | 0..1 | | | GLOBAL | ignore |
| >CSG Id | | 1..<maxnoofCSGId> | 9.2.1.62 | | - | |
| Paging Priority | O | | 9.2.1.78 | | YES | ignore |
| Additional Capabilities | O | | | | | |

METHODS AND ARRANGEMENTS IN A WIRELESS COMMUNICATION NETWORK FOR MANAGING CAPABILITY INFORMATION FOR PAGING

TECHNICAL FIELD

Embodiments herein relate to methods and arrangements in a wireless communication network, e.g. telecommunication network, for managing information for use when paging a communication device, such as a user equipment.

BACKGROUND

Communication devices such as user equipments (UEs) are also known as e.g. wireless devices, mobile terminals, wireless terminals, user terminals and/or mobile stations. A UE is enabled to communicate wirelessly in a wireless communication network, cellular communication network, wireless communication system, or radio communication system, sometimes also referred to as a cellular radio system, cellular network or cellular communication system. The communication may be performed e.g. between two UEs, between a UE and a regular telephone and/or between a UE and a server via a Radio Access Network (RAN) and possibly one or more core networks, comprised within the wireless communication network. The UE may further be referred to as a mobile telephone, cellular telephone, laptop, Personal Digital Assistant (PDA), tablet computer, just to mention some further examples. The UE may be, for example, portable, pocket-storable, hand-held, computer-comprised, or vehicle-mounted mobile device, enabled to communicate voice and/or data, via the RAN, with another entity, such as another wireless device or a server.

The wireless communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. Cells may overlap so that several cells cover the same geographical area. By the base station serving a cell is meant that the base station provides radio coverage such that one or more UEs located in the geographical area where the radio coverage is provided may be served by the base station. When a UE is said to be served in or by a cell this implies that the UE is served by the base station providing radio coverage for the cell. One base station may serve one or several cells. Further, each base station may support one or several communication technologies. The base stations communicate over the air interface operating on radio frequencies with the UE within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

Paging is a mechanism for a wireless communication network to initiate setting up a connection with a UE when the UE is in an idle state, such as the so called RRC_IDLE state in LTE. In the following paging is discussed mainly in the context of LTE. The UE monitors so called L1/L2 control signaling to receive the downlink scheduling assignments related to paging. During a paging cycle, a UE is allowed to sleep and subject to only briefly wake up to monitor the L1/L2 control signaling. If the UE detects a group identity used for paging, i.e. P-RNTI, when it wakes up, it will process the corresponding downlink paging message. The message will be discarded if the UE cannot find its identity otherwise it will response by initiating random access response.

A paging cycle for a UE can range from once per 256 up to once per 32 frames, whereas in which frame it is supposed to wake up is determined by an equation that includes the identity of the terminal. From a network standpoint, paging may be transmitted more often than once per 32 frames, although not all UEs can be paged at all paging occasions since they are distributed across possible paging instances.

Paging of a UE in Evolved Packet System (EPS) is initiated from the core network, typically triggered by arrival of downlink user data. The user data to be delivered is buffered in the Serving Gateway (SGW)), which sends a Downlink Data Notification GPRS Tunneling Protocol (GTPv2-C) message to the Mobility Management Entity (MME). The MME checks which eNBs that have cells belonging to any of Tracking Areas (TAs) whose Tracking Area Identities (TAIs) are included in a UE's current TAI list and sends a PAGING S1 Application Protocol message (S1AP) message across the S1 interface to each of these eNBs, requesting the eNB to page the UE in all cells belonging to any of the concerned TAs, i.e. all cells having a TAI that is included in the UE's list of TAIs. The PAGING S1AP message includes a UE identifier based on the International Mobile Subscriber Identity (IMSI) in the UE Identity Index Value Information Element (IE), the UE's list of TAIs in the List of TAIs IE and a possible UE specific Discontinuous Reception (DRX) cycle length in the Paging DRX IE.

Upon reception of the PAGING S1AP message from the MME, the eNB calculates the applicable paging occasions, awaits the next paging occasion and sends a Radio Resource Control (RRC) message, indicated by a DL resource assignment addressed to a paging Radio Network Temporary Identifier (RNTI) on the Physical Downlink Control Channel (PDCCH), to the UE in the subframe corresponding to the paging occasion. The eNB does this for each of its cells that take part in the paging procedure.

It is expected that there will be a very large number of machine-type-communication (MTC) devices in future wireless "Networked society" scenarios. Many such devices will transmit small amount of UL data (e.g. 100 bits) infrequently (e.g. once per hour). In LTE there are plans of introducing a new solution for "low cost/complexity UEs" to target low end applications which only require low data rates. Considering that low average revenue per user is expected, these applications can be utilized over the GSM/GPRS radio interface. As more MTC UEs are deployed, this would require operators to maintain multiple radio access technologies in case there is not enough motivation for MTC UE suppliers to provide modules supporting the LTE radio interface. This would prevent operators to utilize their spectrums efficiently. Therefore, it is necessary to provide the necessary tools for the MTC UE vendors to be able to migrate the low-end MTC UEs from GSM/GPRS networks to LTE networks.

SUMMARY

An object is to provide improvements with regard to support of machine-type-communication (MTC) devices in a wireless communication network, in particular a LTE network.

According to a first aspect of embodiments herein, the object is achieved by a method, performed by a core network node, for transmitting information to be used for paging of a communication device to a first radio network node. The core network node and the first radio network node are comprised in a wireless communication network. The core network node receives information about capability of the communication device with regard to a maximum supported transport block size (TBS). The core network node transmits, to the first radio network node, information about a limitation of the capability of the communication device with regard to maximum supported TBS, which information about the limitation is based on the received information about capability.

According to a second aspect of embodiments herein, the object is achieved by a method, performed by a first radio network node, for receiving information to be used for paging of a communication device from a core network node. The first radio network node and the core network node are comprised in a wireless communication network. The first radio network node receives, from the core network node, information about a limitation of the capability of the communication device with regard to maximum supported TBS.

According to a third aspect of embodiments herein, the object is achieved by a method, performed by a communication device, for providing information about capability of the communication device to a serving radio network node comprised in a wireless communication network. The communication device adds a maximum supported TBS of the communication device to a message. The communication device transmits the message to the serving radio network node.

According to a fourth aspect of embodiments herein, the object is achieved by a core network node for transmitting information to be used for paging of a communication device to a first radio network node. The first radio network node being comprised in a wireless communication network. The core network node is configured to be comprised in the wireless communication network and is further configured to receive information about capability of the communication device with regard to a maximum supported TBS. The core network node is also configured to transmit, to the first radio network node, information about a limitation of the capability of the communication device with regard to maximum supported TBS, which information about the limitation is based on received information about capability.

According to a fifth aspect of embodiments herein, the object is achieved by a first radio network node, for receiving information to be used for paging of a communication device from a core network node. The first radio network node being comprised in a wireless communication network. The first radio network node is configured to be comprised in the wireless communication network and is further configured to receive, from the core network node, information about a limitation of the capability of the communication device with regard to maximum supported TBS.

According to a sixth aspect of embodiments herein, the object is achieved by a communication device for providing information about capability of the communication device to a serving radio network node comprised in a wireless communication network. The communication device is configured to add a maximum supported TBS of the communication device to a message and transmit the message to the serving radio network node.

Embodiments herein enable paging of communication devices, e.g. UEs, that have limited capabilities with regard to TBS, for example as compared to more conventional UEs. Such limitation is expected to be the case for e.g. low cost devices and MTC devices as discussed above. Hence, embodiments herein e.g. provide improvements with regard to support of MTC in wireless communication networks, e.g. LTE networks.

BRIEF DESCRIPTION OF THE DRAWINGS

Examples of embodiments herein are described in more detail with reference to the appended schematic drawings, which are briefly described in the following.

DETAILED DESCRIPTION

As a development towards embodiment herein, the problem indicated in the Background will first be further discussed.

In order for a wireless communication network to reach communication devices, e.g. UEs ,in case of network initiated data transmissions, or to inform of system updates, so called paging is used as discussed in the Background. However, a communication device that is a MTC device, and thus typically of low cost as also discussed in the Background, will typically not be able to be reached by normal paging procedures as it is expected to be capable to receive only a limited maximum Transport Block Size (TBS). This may prevent such a device to receive legacy paging message, i.e. paging messages used hitherto.

Paging message is typically transmitted across multiple cells in a tracking area (in LTE controlled by an MME) since the location of the communication device is not known on a cell level. The size of the paging message sent over the radio interface, the so called Uu interface in LTE, must in this case thus take into account the capabilities of the communication device, i.e. UE, with regard to its supported maximum TBS. However, with the existing paging procedure in LTE, an eNB is unaware if a paging message is addressed to a UE that has limited capabilities with regard to its supported maximum TBS as described above.

In the following, among other things, it is e.g. disclosed how an existing paging procedure in LTE can be enhanced by conveying the limitation of the UE capability, with regards to the UE's maximum supported TBS over the so called S1 interface from the MME to the eNB(s). According to embodiments herein, this can be accomplished by adding a new indication in a new information element (IE), specifying this capability, to the so called PAGING S1AP message e.g., as it is defined in 3GPP TS 36.413, see for example section 9.2.1.98 "UE Radio Capability for Paging", v.11.6.0.

Upon reception of this new information element in the PAGING S1AP message, an eNB becomes aware of the fact that the UE can only receive a paging message that is not larger than its maximum TBS which as mentioned above e.g. may be limited due to the fact that the UE is a low cost device. Based on knowledge about the maximum supported TBS the eNB can then ensure that a paging message and any subsequent messages sent to the UE over the Uu interface will respect the UE's capability with regards to its supported maximum TBS .

Figure 1:
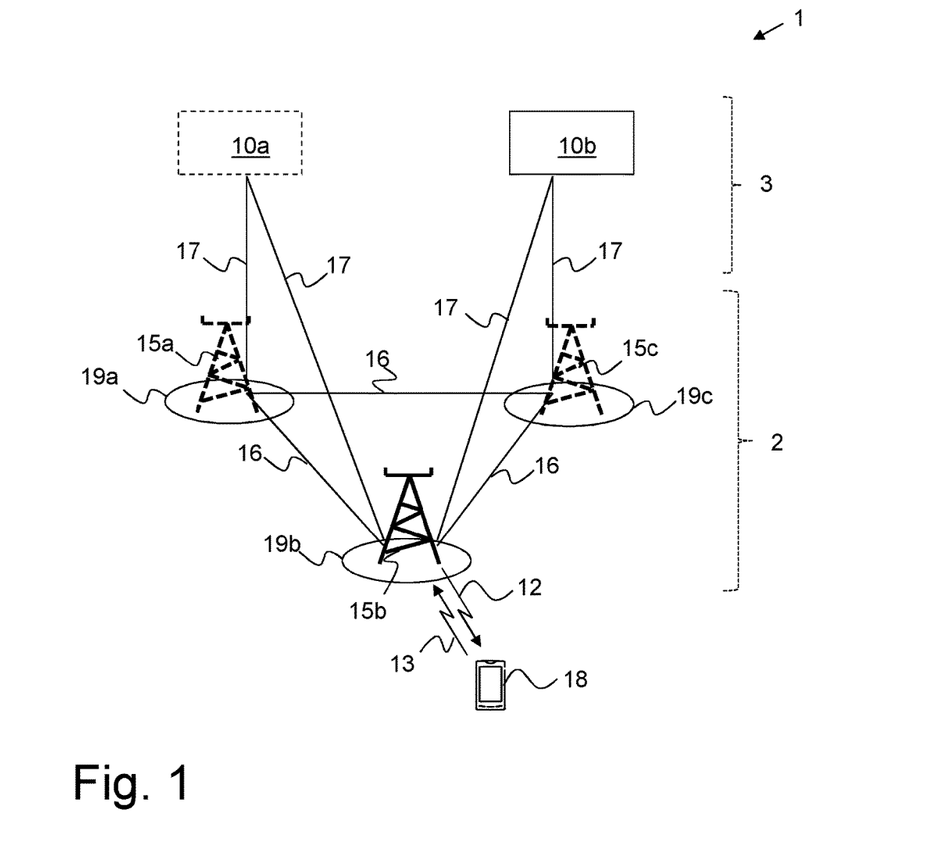
FIG. 1 is a block diagram schematically depicting an example of a wireless communication network in which embodiments herein may be implemented.

FIG. 1 depicts an example of a wireless communication network 1, which also may be named e.g. wireless radio network, in which embodiments herein may be implemented. The wireless communication network 1 may be a LTE network. The wireless communication network 1 includes a Radio Access Network (RAN) 2, such as E-UTRAN. The RAN 2 comprises at least one radio network node, e.g. a first radio network node 15b and/or a second radio network node 15c and/or a third radio network node 15a, such as Radio Base Stations (RBS), or simply base station, as shown in the figure, which in the LTE system is called eNodeB or eNB. In case of LTE, the radio network nodes 15a-c are connected over an interface 17, such as the so called S1-interface in LTE, to one or more core network nodes 10a-b that are part of a core network (CN) 3 comprised in the wireless communication network 1. The one or more core network nodes 10a-b comprise a core network node 10b, e.g. a mobility management entity (MME) node. and e.g. a server gateway (S-GW) node. The one or more core network nodes 15a-b handle control signalling for instance for mobility, and are connected to external networks (not shown in FIG. 1) such as a Public Switched Telephone Network (PSTN) or a Integrated Services Digital Network (ISDN), and/or a connectionless external network as the Internet.

The RAN 2 provides communication and control for a plurality of user nodes or UEs, e.g. a communication device 18. The communication device 18 may e.g. be a telemetry node or any device able to communicate over a radio interface. Each radio network node 15a-c serves at least one cell. For example, the radio network nodes 15a-c serves cells 19a-c respectively. The first radio network node 15b is thus serving at least the cell 19b through and in which the communication device 18 may be moving. The radio network nodes 15a-c are communicating with each other over a communication interface 16, such as the so called X2 interface in LTE. Communication devices, such as the communication device 18, each uses downlink (DL) channels 12 and uplink (UL) channels 13 to communicate with at least one radio network node, e.g. the 15a-b over a radio or air interface.

The wireless communication network 1 covers a geographical area which is divided into cell areas, e.g. the cell areas 19a-c, wherein each cell area being served by a base station that e.g. may be any of the radio network nodes 15a-c, which sometimes may be referred to as e.g. "eNB", "eNodeB", "NodeB", "B node", Base Transceiver Station (BTS), or AP(Access Point), depending on the technology and terminology used. The base stations may be of different classes such as e.g. macro NodeB, home NodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

According to some embodiments, the wireless communication network 1 is a LTE system and many details and examples are in the context of LTE. The skilled person, however, realizes that embodiments herein may be implemented also in other contexts, e.g. where the wireless communication network 1 is a GSM or WCDMA system. The communication device 18, e.g. user equipment, may be any one of mobile stations such as mobile telephones ("cellular" telephones), tablets, and laptops with mobile termination and thus can be, for example, portable, pocket, hand-held, computer-included or car-mounted mobile devices which communicate voice and/or data with the RAN 2. The communication device 18 may also be a telemetry node, or any type of node communicating in a radio network system.

Attention is also drawn to that FIG. 1 is only schematic and for exemplifying purpose and that not everything shown in the figure may be required for all embodiments herein, as will be evident to the skilled person. Also, a wireless communication network that in reality corresponds to the wireless communication network 100 typically comprises several further network nodes, base stations, cells etc., as realized by the skilled person, but which are not shown herein for the sake of simplifying.

Figure 2:
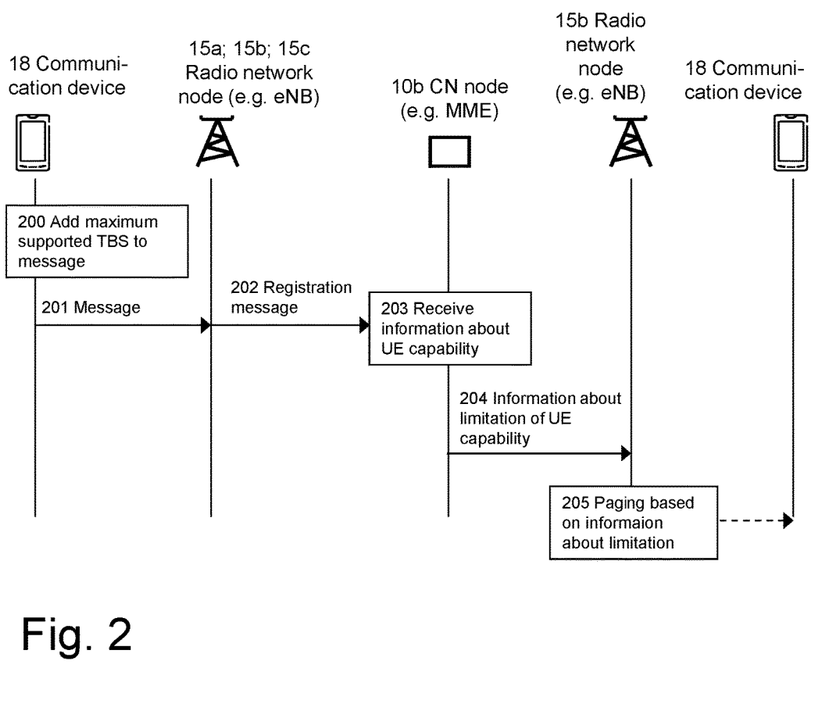
FIG. 2 is a combined signaling diagram and flowchart for describing embodiments herein.

FIG. 2 depicts a combined signaling diagram and flowchart and will be used to discuss examples of embodiments herein relating to methods for managing information that may be used for paging of the communication device 18.

The method comprises the following actions, which actions may be taken in any suitable order and/or be carried out fully or partly overlapping in time when this is possible and suitable.

Action 200

The communication device 18 adds its maximum supported TBS to a message, e.g.

a registration message, for example in a new information element.

Action 201

The communication device 18 transmits the message, e.g. the registration message, including its supported maximum TBS, for example in a new information element. The message is sent to a radio network node serving the communication device 18 at the time the message is sent, e.g. any one of radio network nodes 15a-c, which radio network node thus receives the message. Registration may refer to registration of the COMMUNICATION DEVICE with the wireless communication network 1, such as when connecting to the wireless communication network 1.

Action 202

The radio network node that received the message in Action 201, e.g. any one of radio network nodes 15a-c, may send a registration message based on the received message to the core network node 10b. Sent with the registration message may be information about the communication device's 18 capability with regard to its supported maximum TBS. The sent registration message may but need not be the same message as the message received in Action 201.

Action 203

The core network node 10b, such as MME in case of LTE, receives, with a registration message, information about the communication device's 18 capability with regard to its supported maximum TBS. The registration message in this action may be the registration message received in Action 202.

Reason for the present action is that the core network node 10b, e.g. MME, needs to be aware of the capability of the communication device 18 with regard to its maximum supported TBS so it can then can use it at paging, e.g. by adding it to a PAGING S1AP message at a paging procedure as will be exemplified and described below.

The present action may be accomplished e.g. by enhancing an already existing registration message, e.g. TRACKING AREA UPDATE REQUEST message, with a new information element specifying the capability of the communication device 18 with regard to its maximum supported TBS and thus making it available to the core network node 10b at registration.

Action 204

The core network node 10b, e.g. MME, transmits information about a limitation of the communication device's 18 capability with regard to its maximum supported TBS over the S1 interface to the first radio network node 15b, e.g. eNB. The information about the limitation is thus based on the received information about capability in Action 203. The information about limitation may but need not be the same information as the information about capability.

The information about the capability with regard to the communication device's 18 supported maximum TBS may be added to a PAGING S1AP message as used in the paging procedure as described in the Background. In other words, an existing PAGING S1AP message may be modified to convey the information about UE capability with regard to the communication device's 18 supported maximum TBS in a new IE.

Hence, the core network node 10b may add a new indication in a new information element of a paging message, which information element specifies the capability of the communication device 18 with regard to its maximum supported TBS. The paging message, e.g. a PAGING S1AP message, may then be transmitted to the first radio network node 15b.

An example of a modified PAGING S1AP message is discussed separately below.

As realized, the present action may be carried out at a later occasion e.g. after the communication device 18 has been served in the wireless communication network 1 for some time, changed location and then is in idle mode.

In accordance with the LTE procedure for paging discussed in the Background, it is realized that the core network node 10b, i.e. MME in case of LTE, may find out about that it shall transmit to the first radio network node 15b by first checking which eNBs that have cells belonging to any of TAs whose TAIs are included in the communication device's 18 current TAI list, which eNBs include the first radio network node 15b. Then the information about the limitation, e.g. comprised in the PAGING S1AP message, is transmitted across a S1 interface to each of these eNBs, thereby also requesting the eNBs, including the first radio network node 15b, to page the communication device 18 in all cells belonging to any of the concerned TAs, i.e. all cells having a TAI that is included in the communication device's 18 list of TAIs.

Action 205

The first radio network node 15b pages the user equipment 18 based on the in Action 204 received information about the limitation. Based on the received information about the limitation, the communication device 18 may be paged in the present action and any subsequent information be sent to the communication device 18 while ensuring that the supported maximum TBS is respected, e.g. not exceeded.

For example, upon reception of the above-mentioned new IE in the PAGING S1AP message, the first radio network node 15b, e.g. eNB, becomes aware of the fact that the communication device 18 can only receive a paging message that is not larger than its maximum TBS which may be limited due to the fact that the communication device 18 is a low cost device. The first radio network node 15b thereby knows it needs to ensure that a paging message and any subsequent messages sent to the communication device 18 over the so called Uu interface in LTE respect the capability of the communication device 18 with regard to its supported maximum TBS.

Hence, embodiments herein enable paging of communication devices that have limited capabilities with regard to TBS, for example as compared to legacy communication devices. Such limitation is expected to be the case for e.g. low cost devices and MTC devices as discussed above. Hence, embodiments herein e.g. provide improvements with regard to support of MTC in wireless communication networks, e.g. LTE networks.

Another advantage with embodiments described herein is that communication devices that support limited maximum TBS, e.g. low cost communication devices and/or MTC devices, are available for so called Mobile Terminated sessions.

Figure 3:
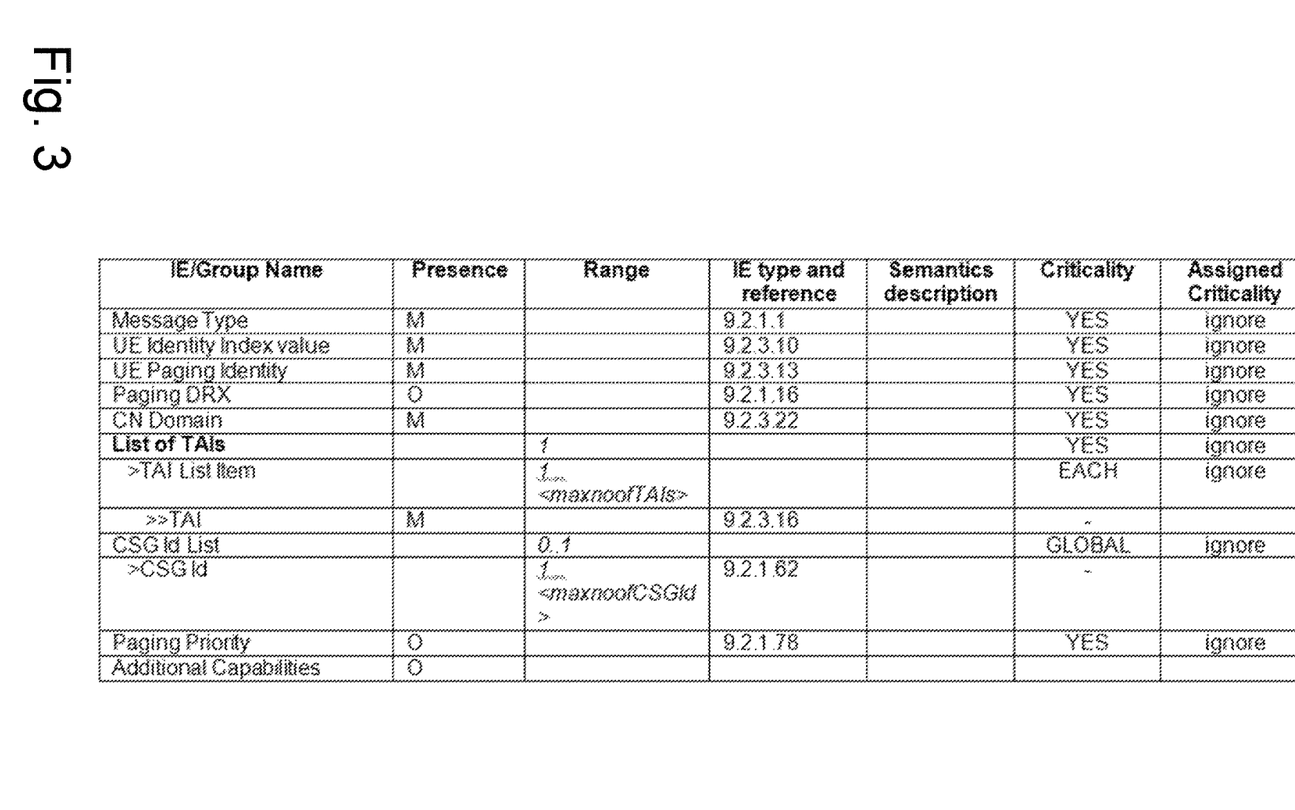
FIG. 3 shows one example of how an existing PAGING S1AP message can be modified.

FIG. 3 shows one example of how an existing PAGING S1AP message can be modified to convey information about UE capability, such as capability of the communication device 18, with regard to supported maximum Transport Block Size. In the example a new IE, designated as Additional Capabilities, has been added.

Figure 4:
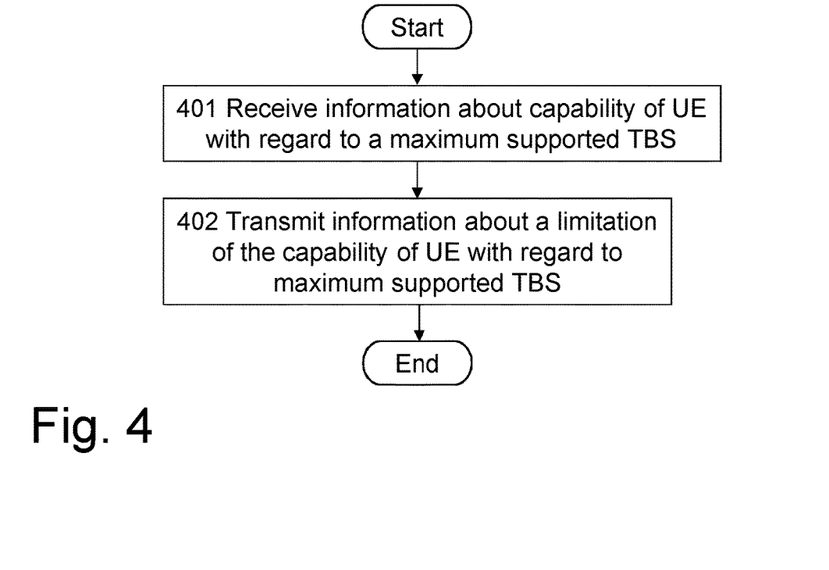
FIG. 4 is a flowchart schematically illustrating embodiments of a method performed in a core network node.

FIG. 4 is a flow chart schematically illustrating embodiments of a method, performed by the core network node 10b, for transmitting information to be used for paging the communication device 18 to the first radio network node 15b. As mentioned above, the core network node 10b and the first radio network node 15b are comprised in the wireless communication network 1.

The method comprises the following actions, which actions may be taken in any suitable order and/or be carried out fully or partly overlapping in time when this is possible and suitable.

Action 401

The core network node 10b receives information about capability of the communication device 18 with regard to a maximum supported TBS.

The received information may be comprised in a registration message received from a serving radio network node, e.g. any of the radio network nodes 15a-c.

This action may fully or partly correspond to Action 203 above.

Action 402

The core network node 10b transmits, to the first radio network node 15b, information about a limitation of the capability of the communication device 18 with regard to maximum supported TBS. The information about the limitation is based on the received information about capability in Action 401.

In some embodiments, the wireless communication network 1 is a LTE network, the core network node 10b is a MME, the first radio network node 15b is an eNB. In these embodiments the core network node 10b may receive the information comprised in the registration message and/or may transmit the information about limitation over one or more S1 interfaces.

A paging message may convey said information about limitation of the capability of the communication device 18 and be transmitted to the first radio network node 15b. The paging message may be based on an application protocol for use over S1 interfaces (S1AP).

This action may fully or partly correspond to Action 204 above.

Figure 5:
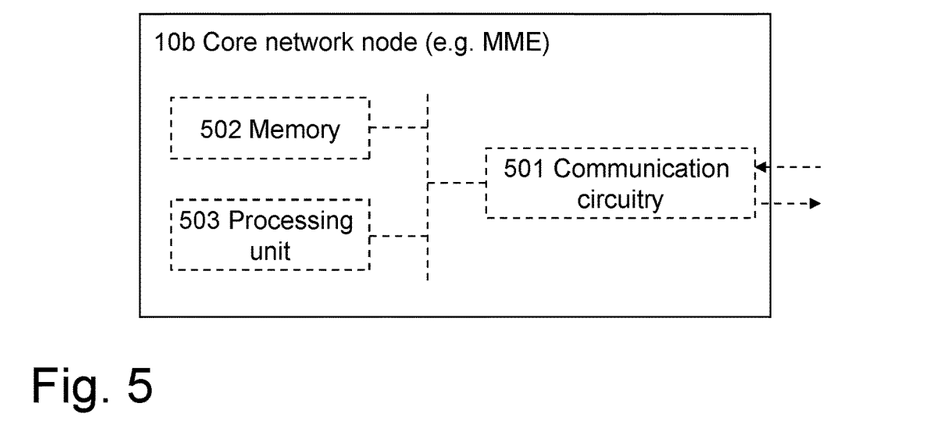
FIG. 5 is a functional block diagram for illustrating embodiments of the core network node.

FIG. 5 is a schematic block diagram for illustrating embodiments of the core network node 10b mentioned above in connection with FIG. 4, for transmitting information to be used for paging of the communication device 18 to the first radio network node 15b, in particular how the core network node 10b may be configured to perform the method and actions discussed above in connection with FIG. 4, in addition to be configured to be comprised in the wireless communication network 1.

The core network node 10b may be arranged with, and thus comprise, a communication circuitry 501 to communicate with radio network nodes, e.g. the first radio network node 15b, and other and core network nodes, a memory 502 to store information related to embodiments described herein, and a processing unit 503 for e.g. processing received information.

The communication circuitry 501 may be configured to receive the communication device's 18 capability with regard to its maximum supported TBS with a registration message.

The memory 502 is configured to e.g. store information about served communication devices.

The processing unit 503 may be configured to add a new indication in a new information element of a paging message, which information element specifies the communication device's 18 capability with regard to its maximum supported TBS.

The communication circuitry 501 may be further configured to transmit information about the limitation of the communication device's 18 capability with regard to its maximum supported TBS over a S1 interface to the first radio network node 15b.

Hence, according to the various embodiments described above, the core network node 10b and/or the communication circuitry 501 and/or the processing unit 503 and/or the memory 502, are operative, or configured, to receive said information about capability of the communication device 18 with regard to the maximum supported TBS. The information to receive may be comprised in said registration message that may be received from said radio network node, e.g. any one of the radio network nodes 15a-c.

Moreover, according to the various embodiments described above, the core network node 10b and/or the communication circuitry 501 and/or the processing unit 503 and/or the memory 502, are operative, or configured, to transmit, to the first radio network node 15b, information about the limitation of the capability of the communication device 18 with regard to maximum supported TBS, which information about the limitation is based on received information about capability.

In embodiments where the wireless communication network 1 is an LTE network, the core network node 10b is a MME node and the first radio network node 15b is an eNB, the core network node 10b and/or the communication circuitry 501 and/or the processing unit 503 and/or the memory 502, may be operative, or configured, to transmit the information about limitation over one or more Si interfaces.

In embodiments where said paging message convey said information about limitation of the capability of the communication device 18, the core network node 10b and/or the communication circuitry 501 and/or the processing unit 503 and/or the memory 502 may be configured to transmit the paging message to the first radio network node 15b.

Figure 6:
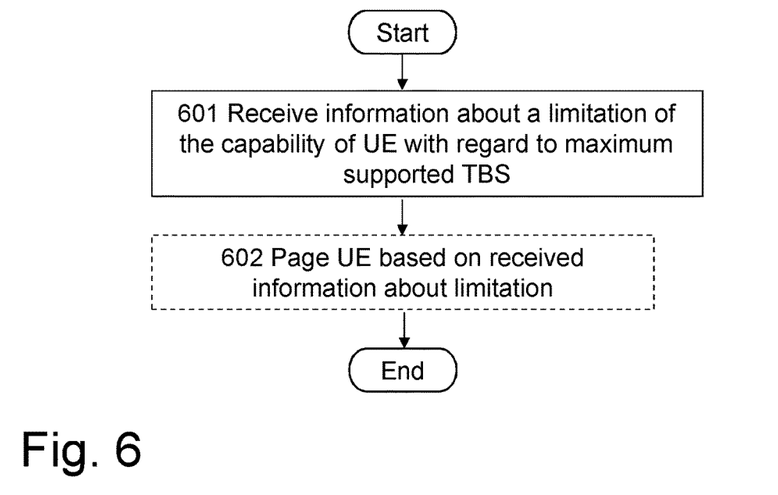
FIG. 6 is a flowchart schematically illustrating embodiments of a method performed in a radio network node.

FIG. 6 is a flow chart schematically illustrating embodiments of a method, performed by the first radio network node 15b, for receiving information to be used for paging of the communication device 18 from the core network node 10b.

The method comprises the following actions, which actions may be taken in any suitable order and/or be carried out fully or partly overlapping in time when this is possible and suitable.

Action 601

The first radio network node 15b receives, from the core network node 10b, information about a limitation of the capability of the communication device 18 with regard to maximum supported TBS.

A paging message, received from the core network node 10b, may convey said information about limitation of the capability of the communication device 18. The paging message may be based on an application protocol for use over S1 interfaces (S1AP).

In some embodiments, the wireless communication network 1 is a LTE network, the core network node 10b is a MME node and the first radio network node 15b is an eNB.

In these embodiments the first radio network node 15b may receive the information about limitation over one or more S1 interfaces.

This action may fully or partly correspond to Action 204 above.

Action 602

The first radio network node 15b may page the communication device 18 based on the received information about the limitation.

This action may fully or partly correspond to Action 205 above.

Figure 7:
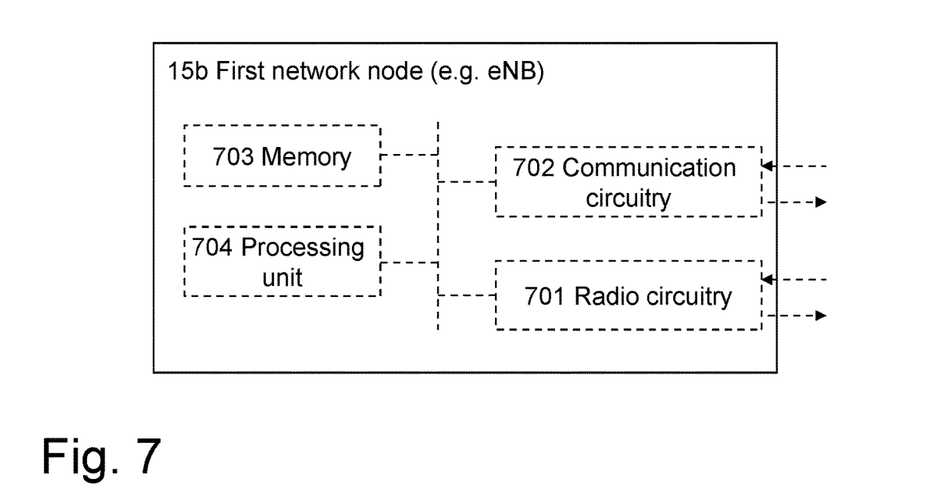
FIG. 7 is a functional block diagram for illustrating embodiments of the first radio network node.

FIG. 7 is a schematic block diagram for illustrating embodiments of the first radio network node 15b mentioned above in connection with FIG. 6, for receiving information to be used for paging of the communication device 18 from the core network node 10b, in particular how the first radio network node 15b may be configured to perform the method and actions discussed above in connection with FIG. 6 in addition to that the first radio network node 15b is configured to be comprised in the wireless communication network 1.

The first radio network node 15b may be arranged with, and thus may comprise, a radio circuitry 701 to communicate with served communication devices, e.g. the communication device 18, a communication circuitry 702 to communicate with other radio network nodes, e.g. the radio network nodes 15a-c, and core network nodes, e.g. the core network node 10b, a memory 703 to store information related to embodiments described herein, and a processing unit 704 for e.g. processing received information. The memory 703 is configured to e.g. store information about served communication devices. The radio circuitry 701 is configured to e.g. communicate with served communication devices, including paging of communication devices.

The communication circuitry 702 may be configured to receive information about the limitation of the communication device's 18 capability with regard to its maximum supported TBS over an S1 interface from the core network node 10b, e.g. MME.

Hence, according to the various embodiments described above, the first radio network node 15b and/or the communication circuitry 702 and/or the processing unit 704 and/or the memory 703, are operative, or configured, to receive, from the core network node 10b, information about the limitation of the capability of the communication device 18 with regard to said maximum supported TBS. Said information about limitation of the capability of the communication device 18 may be conveyed in a paging message.

Moreover, according to the various embodiments described above, the first radio network node 15b and/or the radio circuitry 701 and/or the processing unit 704 and/or the memory 703, may be operative, or configured, to page the communication device 18 based on the received information about the limitation.

In some embodiment, the wireless communication network 1 is a LTE network, the core network node 10b is a MME and the first radio network node 15b is an eNB. In these embodiments, the first radio network node 15b and/or the radio circuitry 701 and/or the processing unit 704 and/or the memory 703, may be operative, or configured to receive the information about limitation over one or more S1 interfaces.

Figure 8:
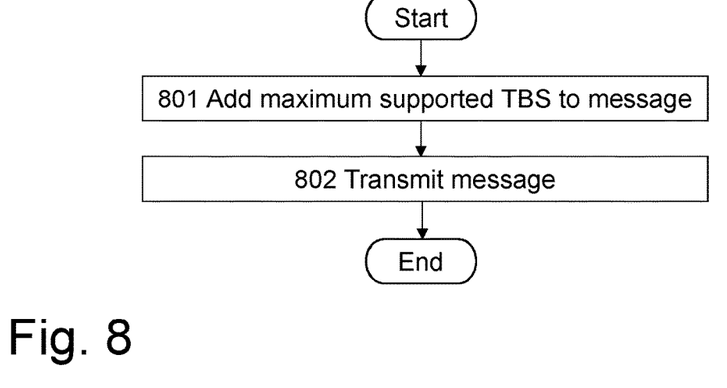
FIG. 8 is a flowchart schematically illustrating embodiments of a method performed in a communication device.

FIG. 8 is a flow chart schematically illustrating embodiments of a method, performed by the communication device 18, for providing information about capability of the communication device 18 to a serving radio network node, e.g. any one of the radio network nodes 15a-c, when serving the communication device 18. The serving radio network node is thus comprised in the wireless communication network 1.

The method comprises the following actions, which actions may be taken in any suitable order and/or be carried out fully or partly overlapping in time when this is possible and suitable.

Action 801

The communication device 18 adds a maximum supported TBS of the communication device 18 to a message.

This action may fully or partly correspond to Action 200 above.

Action 802

The communication device 18 transmits the message from Action 801 to the serving radio network node, e.g. any one of the radio network nodes 15a-c, which message thus includes the maximum supported TBS of the communication device 18.

This action may fully or partly correspond to Action 201 above.

Figure 9:
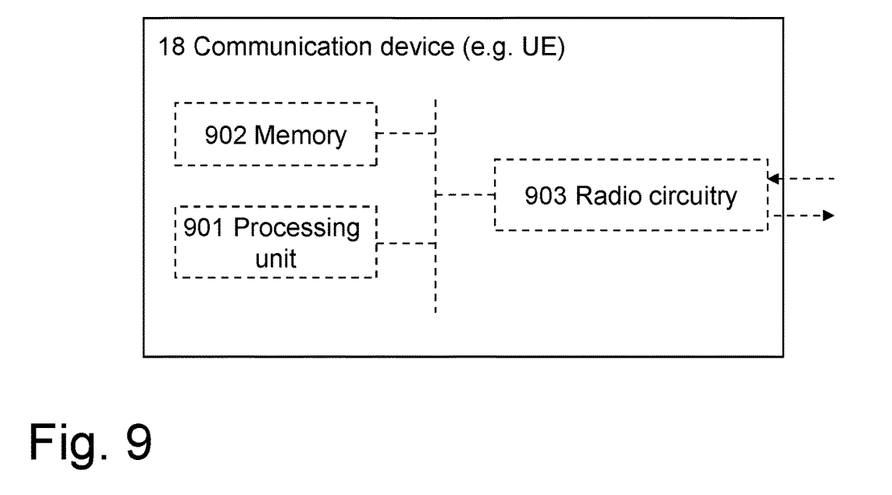
FIG. 9 is a functional block diagram for illustrating embodiments of the communication device.

FIG. 9 is a schematic block diagram for illustrating embodiments of the communication device 18 mentioned above in connection with FIG. 8, for providing information about capability of the communication device 18 to said serving radio network node, e.g. any one of the radio network nodes 15a-c, in particular how the communication device 18 may be configured to perform the method and actions discussed above in connection with FIG. 8.

The communication device 18 may be arranged with a radio circuitry 901 to communicate with radio network nodes, such as eNBs, e.g. any one of the radio network nodes 15a-c, a memory 902 to store information related to embodiments described herein, and a processing unit 903 for e.g. processing received information. The memory 902 is configured to store information. The radio circuitry 901 is configured to communicate with eNBs, e.g. the radio network nodes 15a-c, such as to receive paging messages.

The radio circuitry 901 may be further configured to transmit a registration message or other message(s) including its maximum supported TBS, for example in a new information element.

The processing unit 903 may be configured to add maximum supported TBS to a registration message, for example in a new information element.

Hence, according to the various embodiments described above, the communication device 18 and/or the processing unit 903 and/or the memory 902, are operative, or configured, to add the maximum supported TBS of the communication device 18 to said message.

Moreover, according to the various embodiments described above, the communication device 18 and/or the radio circuitry 901 and/or the processing unit 903 and/or the memory 902 are operative, or configured, to transmit the message to the serving radio network node, e.g. any one of the radio network nodes 15a-c.

Those skilled in the art will realize that the circuitry, units, memory etc discussed herein may refer to a combination of hardware modules, software modules, analog and digital circuits, and/or one or more processors configured with software and/or firmware, e.g. stored in memory, that, when executed by e.g. the processing units make the core network node 10b and/or the first radio network node 15b to be configured to and/or to perform the above-described methods, respectively.

The term "network node" as used herein may as such refer to any type of radio network node (described below) or any network node, which may communicate with at least a radio network node.

The term "radio network node" as used herein may as such refer to any type of network node capable of serving a communication device, and/or that are connected to other network node(s) or network element(s) or any radio node from which a wireless device receives signals. A radio network is typically comprised in a Radio Access Network (RAN) part of a wireless communication network. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, nodes in distributed antenna system (DAS) etc.

The term "node" as used herein may be used for the sake of simplicity, in order to denote a node which may be a network node, a radio network node or a wireless device, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As should be recognized by the skilled person. term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or arranged to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a first radio network node, for receiving information to be used for paging of a communication device from a core network node, the core network configured to receive information in a first information element from the communication device about capability of the communication device, the information including specifying a maximum supported transport block size (TBS), the first radio network node and the core network node being comprised in a wireless communication network, the method comprising:
 transmit the information from the communication device about capability of the communication device to the core network node;
 in response to the transmitted information, receiving a paging message from the core network node, the paging message containing a second information element specifying the maximum supported TBS; and
 configuring transmissions to the communication device associated with the paging message such that the paging message to be received by the communication device has a TBS that does not exceed the maximum supported TBS.

2. The method according to claim 1, wherein the method further comprises:
 paging the communication device based on the received information about the limitation.

3. The method according to claim 1, wherein the wireless communication network is a Long Term Evolution (LTE) network, the core network node is a Mobility Management Entity (MME) node, and the first radio network node is an evolved Node B (eNB), wherein the first radio network node receives the information about limitation over at least one S1 interface.

4. The method according to claim 1, wherein the paging message is transmitted to a plurality of network nodes having tracking area identities (TAIs) associated with the communication device, the paging message configured to cause each the plurality of network nodes to page the communication device.

5. A first radio network node for receiving information to be used for paging of a communication device from a core network node, the core network configured to receive information in a first information element from the communication device about capability of the communication device, the information specifying a maximum supported transport block size (TBS), the first radio network node being comprised in a wireless communication network, the first radio network node being configured to be comprised in the wireless communication network and the first radio network node is further configured to:
 transmit the information from the communication device about capability of the communication device to the core network node;
 in response to the transmitted information, receive a paging message from the core network node, the paging message containing second information element specifying the maximum supported TBS; and
 configure transmissions to the communication device associated with the paging message such that the paging message to be received by the communication device has a TBS that does not exceed the maximum supported TBS.

6. The first radio network node according to claim 5, wherein the first radio network node is further configured to:
   page the communication device based on the received information about the limitation.

7. The first radio network node according to claim 5, wherein the wireless communication network is a Long Term Evolution (LTE) network, the core network node is a Mobility Management Entity (MME) node, and the first radio network node is an evolved Node B (eNB), wherein the first radio network node is configured to receive the information about limitation over at least one S1 interface.

8. The first radio network node according to claim 5, wherein the paging message is transmitted to a plurality of network nodes having tracking area identities (TAIs) associated with the communication device, the paging message configured to cause each the plurality of network nodes to page the communication device.

* * * * *